US010798334B2

(12) United States Patent
Zhang et al.

(10) Patent No.: US 10,798,334 B2
(45) Date of Patent: Oct. 6, 2020

(54) IMAGE PROCESSING SYSTEM, IMAGE DISPLAY METHOD, DISPLAY DEVICE AND STORAGE MEDIUM

(71) Applicants: Beijing BOE Display Technology Co., Ltd., Beijing (CN); BOE Technology Group Co., Ltd., Beijing (CN)

(72) Inventors: Jian Zhang, Beijing (CN); Jieqiong Wang, Beijing (CN); Ming Chen, Beijing (CN); Hao Zhu, Beijing (CN); Luqiang Guo, Beijing (CN)

(73) Assignees: BEIJING BOE DISPLAY TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/473,285

(22) PCT Filed: Apr. 28, 2018

(86) PCT No.: PCT/CN2018/085041
§ 371 (c)(1),
(2) Date: Jun. 25, 2019

(87) PCT Pub. No.: WO2019/041863
PCT Pub. Date: Mar. 7, 2019

(65) Prior Publication Data
US 2020/0145607 A1 May 7, 2020

(30) Foreign Application Priority Data
Aug. 31, 2017 (CN) .......................... 2017 1 0771113

(51) Int. Cl.
H04N 7/01 (2006.01)

(52) U.S. Cl.
CPC ......... *H04N 7/0117* (2013.01); *H04N 7/0127* (2013.01)

(58) Field of Classification Search
CPC ...... H04N 7/0125; H04N 7/01; H04N 7/0117; H04N 7/0127; G09G 5/006; G09G 5/005; G09G 2340/0407; G09G 2340/0421
(Continued)

(56) References Cited

U.S. PATENT DOCUMENTS

2002/0034254 A1   3/2002  Yamada
2005/0134731 A1*  6/2005  Lee ...................... G06T 3/4007
                                                              348/458
(Continued)

FOREIGN PATENT DOCUMENTS

CN    1678070 A    10/2005
CN    102592555 A   7/2012
(Continued)

OTHER PUBLICATIONS

International Search Report (including Written Opinion) of the PCT application No. PCT/CN2018/085041 dated Jul. 19, 2018.

*Primary Examiner* — Sherrie Hsia
(74) *Attorney, Agent, or Firm* — Fay Sharpe LLP

(57) ABSTRACT

This application discloses an image processing system, an image display method, a display device, and a storage medium, which belongs to the field of display technology. The method includes: acquiring a first resolution supported by a display panel currently installed in the display device; identifying a second resolution of pending image data input by a video source to the image processing system; determining a target data processing module in at least two data processing modules; retrieving the target data processing module to process the pending image data to obtain target image data; and outputting the target image data to the display panel. Since at least two data processing modules are
(Continued)

provided in the image processing system, the image processing system may be compatible with display panels having at least two resolutions, which effectively improves the compatibility of the image display system. This application is used in display devices.

20 Claims, 8 Drawing Sheets

(58) Field of Classification Search
USPC ........ 348/441, 458, 459, 443, 442; 345/698, 345/699
See application file for complete search history.

(56) References Cited

U.S. PATENT DOCUMENTS

| | | |
|---|---|---|
| 2005/0213833 A1 | 9/2005 | Okada et al. |
| 2014/0043431 A1 | 2/2014 | Kato |
| 2014/0098289 A1* | 4/2014 | Jang .................... G11B 27/105 348/441 |

FOREIGN PATENT DOCUMENTS

| | | |
|---|---|---|
| CN | 103636197 A | 3/2014 |
| CN | 107493448 A | 12/2017 |

* cited by examiner

IMAGE PROCESSING SYSTEM, IMAGE DISPLAY METHOD, DISPLAY DEVICE AND STORAGE MEDIUM

CROSS-REFERENCE TO RELATED APPLICATION

This application is a 371 of PCT Patent Application Serial No. PCT/CN2018/085041, filed on Apr. 28, 2018, which claims priority to Chinese Patent Application No. 201710771113.5, filed with the National Intellectual Property Administration of P.R.C. on Aug. 31, 2017 and entitled "IMAGE PROCESSING SYSTEM, IMAGE DISPLAY METHOD AND DISPLAY DEVICE", the entire contents of which are incorporated herein by reference.

TECHNICAL FIELD

The present application relates to the field of display technology, and in particular to an image processing system, an image display method, a display device and a storage medium.

BACKGROUND

With the development of technology, many high-resolution display devices with high-resolution display panels have appeared on the market. For example, the high-resolution display panel may be a display panel having a resolution of 4096×2160 pixels (4K for short) or 7680×4320 pixels (8K for short). The display device may further include: a timing controller (TCON for short), a source driver and a gate driver. The main function of the TCON is to process the data of each frame of image to generate a data signal and a control signal corresponding to the data of each frame of image. The control signal is transmitted to the gate driver, and the gate controller cyclically outputs activating and deactivating voltages to the gate lines in the display panel based on the control signals. The data signal is transmitted to the source driver, and the source driver converts the received data signal into a data voltage to write to the corresponding pixel on the display panel.

SUMMARY

The present application provides an image processing system, an image display method, a display device and a storage medium. The technical solutions are as follows:

According to a first aspect, there is provided an image processing system. The image processing system comprises at least two data processing modules, wherein each of the data processing modules is used to convert image data input to the data processing module into image data having a resolution supported by the data processing module, the resolutions supported by the at least two data processing modules are different, and the image processing system further comprises:

a controller, used for:

acquiring a first resolution supported by a display panel currently installed in a display device;

identifying a second resolution of pending image data input by a video source to the image processing system;

determining, in the at least two data processing modules, a target data processing module according to the first resolution and the second resolution, wherein the target data processing module supports the first resolution, and the target data processing module is used to convert image data having the second resolution input to the target data processing module into image data having the first resolution;

retrieving the target data processing module to process the pending image data to obtain target image data; and outputting the target image data to the display panel.

Optionally, the controller is further used for:

determining, when it is detected that an input signal of the video source is abnormal, an alternate display line of a previous image frame of a currently displayed image frame of the display panel, wherein a line number of the alternate display line is a line number of a currently displayed line plus 1; and outputting image data starting from the alternate display line in the previous image frame to the display panel, and repeatedly outputting image data of the previous image frame after the image data of the previous image frame is output until the input signal of the video source is back to normal.

Optionally, the system further comprises:

a memory used to store the previous image frame of the currently displayed image frame;

two line caches comprising a first line cache and a second line cache, wherein the first line cache is used to cache data of a next line of the currently displayed line of the currently displayed image frame, and the second line cache is used to cache data of a line in the previous image frame of the currently displayed image frame with the same line number as cached by the first line cache; wherein the controller is used for:

determining, as the alternate display line, the line of data currently cached by the second line cache; and acquiring, from the memory, image data starting from the alternate display line in the previous image frame, and outputting the image data starting from the alternate display line in the previous image frame to the display panel.

Optionally, the system further comprises: an image memory used to store a currently displayed image frame of the display panel; wherein the controller is further used for:

repeatedly outputting image data of the currently displayed image frame to the display panel until the input signal of the video source is back to normal, when it is detected that an input signal of the video source is abnormal.

Optionally, the controller is further used for:

gradually decreasing a refresh rate of image frames after m consecutive image frames when it is detected that difference between contents of any two adjacent image frames in the m consecutive image frames in the image frames input by the video source is less than a first content difference threshold, and when a refresh rate of the m consecutive image frames is greater than the first refresh rate, until the refresh rate of the image frames after the m consecutive image frames is reduced to a first refresh rate, wherein the m is an integer greater than or equal to 2.

Optionally, the controller is further used for: gradually increasing a refresh rate of image frames after n consecutive image frames when it is detected that difference between contents of any two adjacent image frames in the n consecutive image frames in the image frames input by the video source is greater than a second content difference threshold, and when a refresh rate of the n consecutive image frames is less than the second refresh rate, until the refresh rate of the image frames after the n consecutive image frames is increased to a second refresh rate, wherein the second refresh rate is greater than the first refresh rate, the n is an integer greater than or equal to 2.

Optionally, the difference between contents comprises at least one of gray value difference and pixel value difference.

Optionally, the data processing module is an intellectual property IP core, and the data processing module in the system comprises: at least two of a first IP core, a second IP core, a third IP core, a fourth IP core and a fifth IP core, the first IP core is used to convert image data having a resolution lower than 8K into image data having a resolution of 8K;

the second IP core is used to convert image data having a resolution higher than 4K into image data having a resolution of 4K;

the third IP core is used to convert image data having a resolution lower than 4K into image data having a resolution of 4K;

the fourth IP core is used to convert image data having a resolution of 4K into bright view III image data having a resolution of 4K; and the fifth IP core is used to convert image data having a resolution of 8K into bright view III image data having a resolution of 8K.

Optionally, when the system comprises the fourth IP core or the fifth IP core, the system further comprises: a pixel rendering IP core used to perform a pixel rendering process on virtual display image data.

Optionally, the controller is further used for:

pausing adjustment of a refresh rate of image frames after i consecutive image frames and continuously maintaining the current refresh rate of the image frames in the process of gradually decreasing the refresh rate of the image frames or gradually increasing the refresh rate of the image frames when it is detected that difference in contents of any two adjacent image frames in the i consecutive image frames in the image frames input by the video source is greater than or equal to the first content difference threshold and less than or equal to the second content difference threshold, wherein the i is an integer greater than or equal to 2.

Optionally, the system further comprises: a memory used to store the previous image frame of the currently displayed image frame;

two line caches comprising a first line cache and a second line cache, wherein the first line cache is used to cache data of a next line of the currently displayed line of the currently displayed image frame, and the second line cache is used to cache data of a line in the previous image frame of the currently displayed image frame with the same line number as cached by the first line cache; wherein the controller is further used for:

determining, as the alternate display line, the line of data currently cached by the second line cache;

acquiring, from the memory, image data starting from the alternate display line in the previous image frame, and outputting the image data starting from the alternate display line in the previous image frame to the display panel;

gradually decreasing a refresh rate of image frames after m consecutive image frames when it is detected that difference between contents of any two adjacent image frames in the m consecutive image frames in the image frames input by the video source is less than a first content difference threshold, and when a refresh rate of the m consecutive image frames is greater than the first refresh rate, until the refresh rate of the image frames after the m consecutive image frames is reduced to a first refresh rate, wherein the m is an integer greater than or equal to 2;

gradually increasing a refresh rate of image frames after n consecutive image frames when it is detected that difference between contents of any two adjacent image frames in the n consecutive image frames in the image frames input by the video source is greater than a second content difference threshold, and when a refresh rate of the n consecutive image frames is less than the second refresh rate, until the refresh rate of the image frames after the n consecutive image frames is increased to a second refresh rate, wherein the second refresh rate is greater than the first refresh rate, the n is an integer greater than or equal to 2; and, pausing adjustment of a refresh rate of image frames after i consecutive image frames and continuously maintaining the current refresh rate of the image frames in the process of gradually decreasing the refresh rate of the image frames or gradually increasing the refresh rate of the image frames when it is detected that difference in contents of any two adjacent image frames in the i consecutive image frames in the image frames input by the video source is greater than or equal to the first content difference threshold and less than or equal to the second content difference threshold, wherein the i is an integer greater than or equal to 2; wherein, the difference between contents comprises at least one of gray value difference and pixel value difference.

According to a second aspect, there is provided an image display method. The method is applied in an image processing system in a display device, wherein the image processing system comprises at least two data processing modules, each of the data processing modules is used to convert image date input to the data processing module into image data having a resolution supported by the data processing module, the resolutions supported by the at least two data processing modules are different, and the method comprises:

acquiring a first resolution supported by a display panel currently installed in the display device;

identifying a second resolution of pending image data input by a video source to the image processing system;

determining, in the at least two data processing modules, a target data processing module according to the first resolution and the second resolution, wherein the target data processing module supports the first resolution, and the target data processing module is used to convert image data having the second resolution input to the target data processing module into image data having the first resolution;

retrieving the target data processing module to process the pending image data to obtain target image data; and outputting the target image data to the display panel.

Optionally, the method further comprises:

determining, when it is detected that an input signal of the video source is abnormal, an alternate display line of a previous image frame of a currently displayed image frame of the display panel, wherein a line number of the alternate display line is a line number of a currently displayed line plus 1; and outputting the image data starting from the alternate display line in the previous image frame to the display panel, and repeatedly outputting image data of the previous image frame after the image data of the previous image frame is output until the input signal of the video source is back to normal.

Optionally, the system further comprises: a memory and two line caches, wherein the memory is used to store the previous image frame of the currently displayed image frame, the two line caches comprises a first line cache and a second line cache, the first line cache is used to cache data of a next line of the currently displayed line of the currently displayed image frame, and the second line cache is used to cache data of a line in the previous image frame of the currently displayed image frame with the same line number as cached by the first line cache; and determining the alternate display line of the previous image frame of the currently displayed image frame of the display panel comprises:

determining, as the alternate display line, the line of data currently cached by the second line cache;

outputting the image data starting from the alternate display line in the previous image frame to the display panel comprises:

acquiring, from the memory, image data starting from the alternate display line in the previous image frame, and outputting panel the image data starting from the alternate display line in the previous image frame to the display.

Optionally, the system further comprises: an image memory used to store a currently displayed image frame of the display panel; and the method further comprises:

repeatedly outputting image data of the currently displayed image frame to the display panel when it is detected that the input signal of the video source is abnormal, until the input signal of the video source is back normal.

Optionally, the method further comprises:

gradually decreasing a refresh rate of image frames after m consecutive image frames when it is detected that difference between contents of any two adjacent image frames in the m consecutive image frames in the image frames input by the video source is less than a first content difference threshold, and when a refresh rate of the m consecutive image frames is greater than the first refresh rate, until the refresh rate of the image frames after the m consecutive image frames is reduced to a first refresh rate, wherein the m is an integer greater than or equal to 2.

Optionally, the method further comprises:

gradually increasing a refresh rate of image frames after n consecutive image frames when it is detected that difference between contents of any two adjacent image frames in the n consecutive image frames in the image frames input by the video source is greater than a second content difference threshold, and when a refresh rate of the n consecutive image frames is less than the second refresh rate, until the refresh rate of the image frames after the n consecutive image frames is increased to a second refresh rate, wherein the second refresh rate is greater than the first refresh rate, the n is an integer greater than or equal to 2.

Optionally, the method further comprises:

pausing adjustment of a refresh rate of image frames after i consecutive image frames and continuously maintaining the current refresh rate of the image frames in the process of gradually decreasing the refresh rate of the image frames or gradually increasing the refresh rate of the image frames when it is detected that difference in contents of any two adjacent image frames in the i consecutive image frames in the image frames input by the video source is greater than or equal to the first content difference threshold and less than or equal to the second content difference threshold, wherein the i is an integer greater than or equal to 2.

Optionally, the difference between contents comprises at least one of gray value difference and pixel value difference.

According to a third aspect, there is provided a display device comprising any of the image processing system described in the first aspect.

Optionally, the image processing system is integrated on a timing controller of the display device, or the image processing system is integrated in a separate control chip, or the image processing system is integrated on a graphics card of the display device.

According to a third aspect, there is provided a computer readable storage medium having stored therein a computer program, wherein the stored computer program is capable of implementing any of the image display method described in the second aspect when executed by a processor.

BRIEF DESCRIPTION OF THE DRAWINGS

In order to describe the technical solutions in the embodiments of the present application more clearly, the accompanying drawings need to be used in the description of the embodiments will be briefly introduced below. Apparently, the drawings in the following description show merely some embodiments of the present application, and those ordinarily skilled in the art may also derive other drawings from these drawings without creative efforts.

DETAILED DESCRIPTION

In order to make the objects, technical solutions and advantages of the present application more clear, the embodiments of the present application will be further described in detail with reference to the accompanying drawings.

At present, when a display device displays images through a display panel, an image processing system of the display device needs to process an input video signal to display corresponding images in the display panel. When different types of display panels display images, the images need to be processed in advance by different image processing systems. For example, for a 4K display panel, the image processing system converts the input video signal into a 4K signal that TCON may receive, and then the 4K signal is controlled by the TCON, the source driver, and the gate driver to be displayed in the 4K display panel. For an 8K display panel, the image processing system converts the input video signal into an 8K signal that TCON may receive, and then the 8K signal is controlled by the TCON, the source driver and the gate driver to be displayed in the 8K display panel.

Therefore, different image processing systems are currently required for different display panels, and one image processing system cannot be compatible having different display panels, resulting in poor compatibility of current image processing systems.

Figure 1:
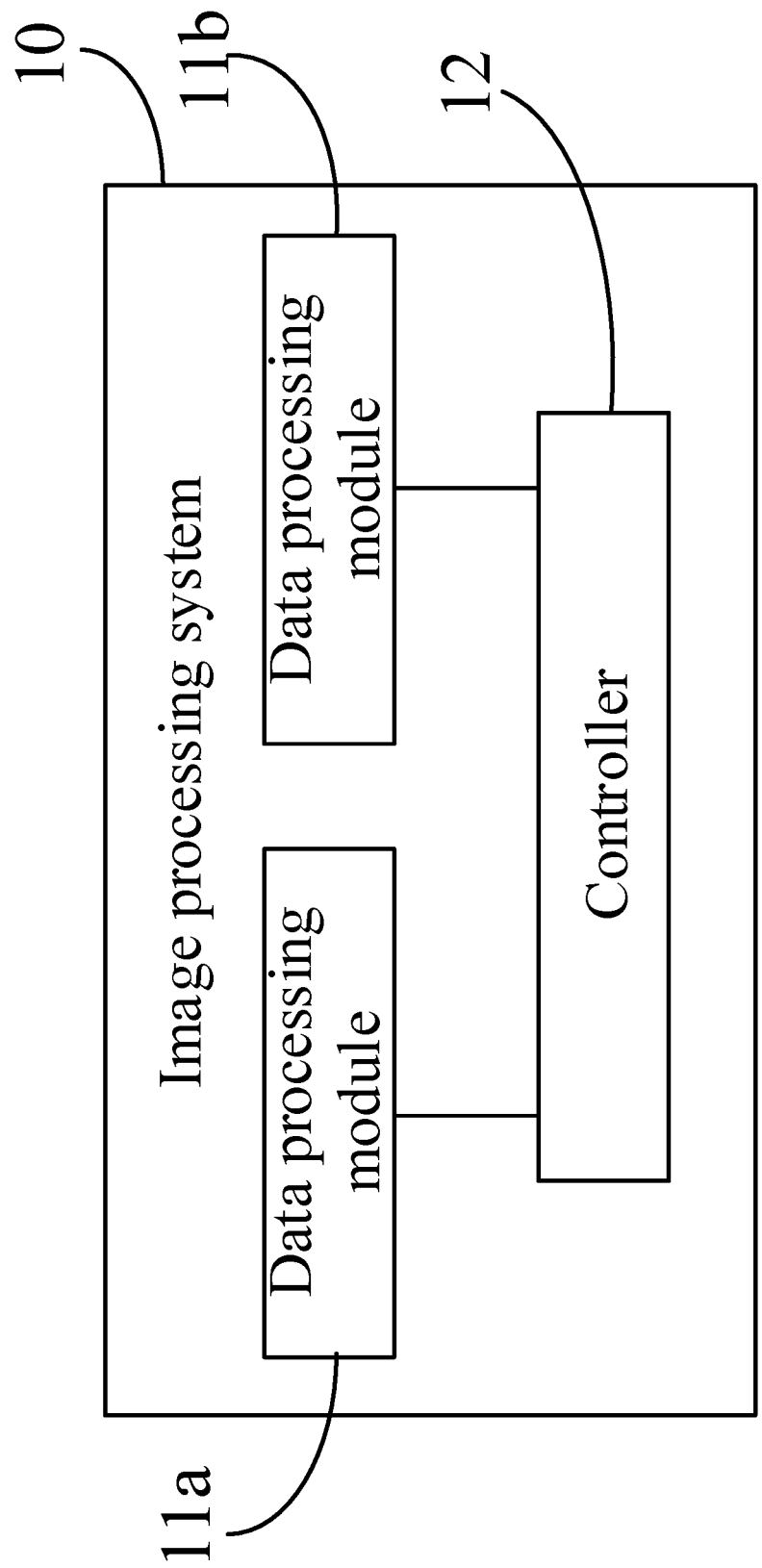
FIG. 1 is a block diagram of an image processing system according to an embodiment of the present application.

An embodiment of the present application provides an image processing system, which may solve the problem of poor compatibility of the image processing system. As shown in FIG. 1, FIG. 1 is an image processing system 10 according to an embodiment of the present application. The image processing system 10 may include at least two data processing modules and a controller 12. For example, the at least two data processing modules include a data processing module 11a and a data processing module 11b.

Each of the data processing modules is used to convert image data input to the data processing module into image data having a resolution supported by the data processing module, and the resolutions supported by the at least two data processing modules are different.

The controller 12 is used for: acquiring a first resolution supported by a display panel currently installed in a display device (usually the highest resolution of the display panel); identifying a second resolution of pending image data input by a video source to the image processing system 10; determining, in the at least two data processing modules, a target data processing module according to the first resolution and the second resolution, wherein the target data processing module supports the first resolution, and the target data processing module is used to convert image data having the second resolution input to the target data processing module into image data having the first resolution; retrieving the target data processing module to process the pending image data to obtain target image data, wherein the target image data is data on which the display panel is based when the display panel displays images, and the target image data is image data having the first resolution; and outputting the target image data to the display panel. In actual application of the embodiment of the present application, the controller 12 may acquire configuration information of the display panel currently installed in the display device. The configuration information of the display panel includes the first resolution supported by the display panel. The controller 12 may extract the first resolution from the configuration information, which is usually stored in the TCON.

In summary, the image processing system according to an embodiment of the present application acquires the first resolution supported by the display panel currently installed in the display device, identifies the second resolution of the pending image data input by the video source to the image processing system and determines a corresponding target data processing module according to the first resolution and the second resolution, to process the pending image data to obtain target image data, and the target image data is applicable to the currently installed display panel. Since at least two data processing modules are provided in the image processing system, the image processing system may be compatible with display panels having at least two resolutions, and the compatibility of the image display system is effectively improved compared with the existing image processing system.

Further, since the image processing system according to an embodiment of the present application may be compatible with display panels having different resolutions, it may be assembled with display panels having different resolutions to form different types of display devices. Compared to the current manufacturing process of different types of display devices, the need to configure different image processing systems for different display panels is eliminated, thereby effectively saving costs. For example, when a 4K display device and an 8K display device are manufactured, a 4K display panel and the image processing system according to an embodiment of the present application can be assembled together to obtain the 4K display device, and an 8K display panel and the image processing system according to an embodiment of the present application can be assembled to obtain the 8K display device.

Figure 2:
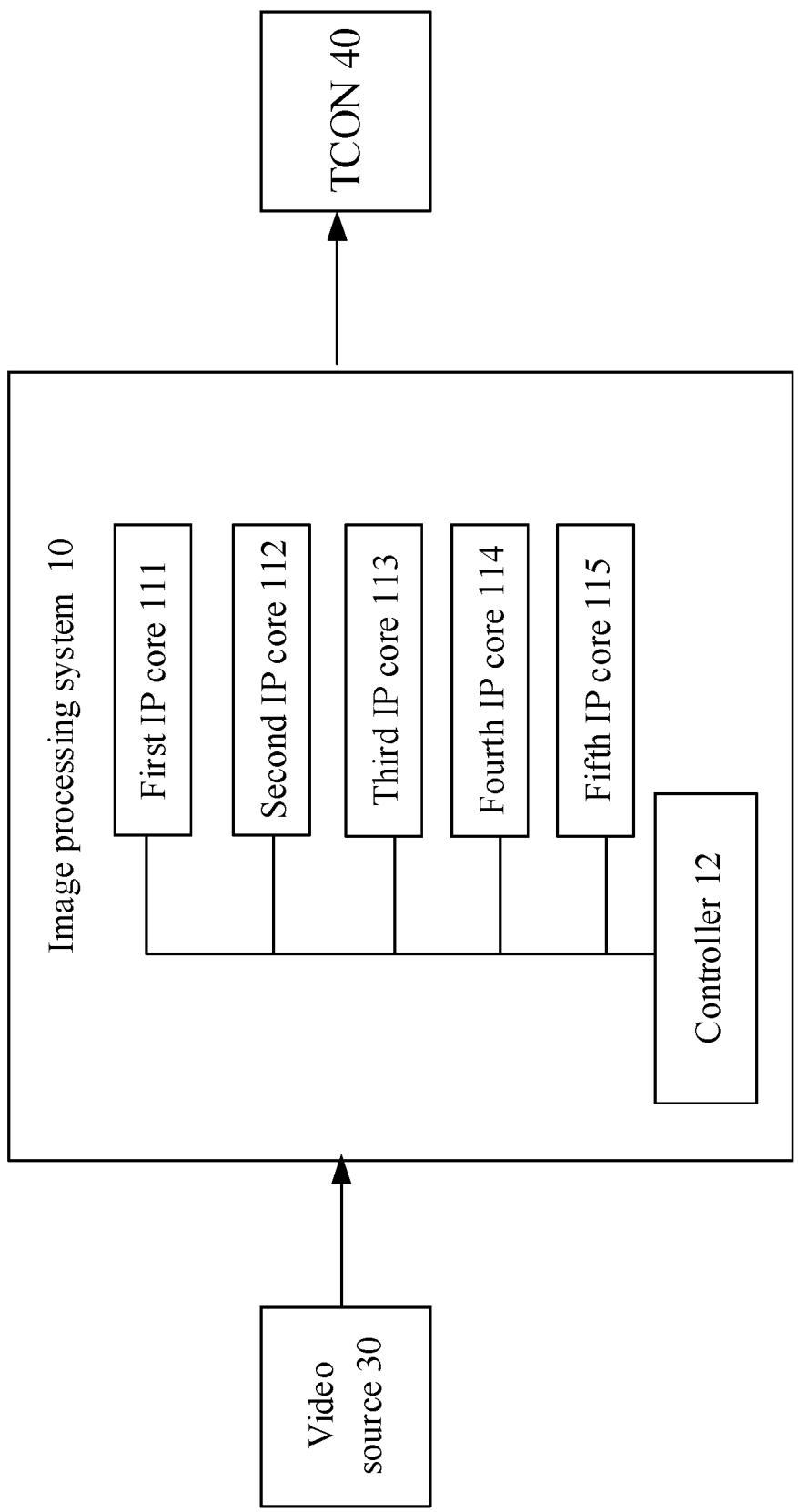
FIG. 2 is a block diagram of another image processing system according to an embodiment of the present application.

Referring to FIG. 2, FIG. 2 is a block diagram of another image processing system 10 according to an embodiment of the present application. The data processing module may be an intellectual property core (IP core for short). The data processing module in the image processing system may include at least two of a first IP core 111, a second IP core 112, a third IP core 113, a fourth IP core 114 and a fifth IP core 115. The first IP core 111 is used to convert image data having a resolution lower than 8K into image data having a resolution of 8K. The second IP core 112 is used to convert image data having a resolution higher than 4K into image data having a resolution of 4K. The third IP core 113 is used to convert image data having a resolution lower than 4K into image data having a resolution of 4K. The fourth IP core 114 is used to convert image data having a resolution of 4K into bright view III (BV3 for short) image data having a resolution of 4K. The fourth IP core 114 may be a 4K BV3 IP core. The fifth IP core 115 is used to process image data having a resolution of 8K into bright view III image data having a resolution of 8K. The fifth IP core 115 may be an 8K BV3 IP core. In practical application of the embodiment of the present application, when the image processing system 10 includes the fourth IP core 114 or the fifth IP core 115, the image processing system 10 may further include a sub pixel rendering (SPR) IP core for performing a pixel rendering process on the BV3 image data. For example, when the image processing system 10 includes the fourth IP core, the SPR IP core is used to perform a pixel rendering process on BV3 image data having a resolution of 4K. When the image processing system 10 includes the fifth IP core, the SPR IP core is used to perform a pixel rendering process on BV3 image data having a resolution of 8K.

For example, as shown in FIG. 2, when the controller 12 acquires that the first resolution supported by the display panel currently installed in the display device is 8K, that is, the display panel currently installed in the display device is an 8K display panel, the controller 12 may determine the second IP core 112 as the target data processing module according to the first resolution and the second resolution and may retrieve the second IP core 112 to convert the pending image data into 8K image data if the controller 12 identifies that the second resolution of the pending image data input by the video source 30 to the image processing system 10 is 4K. The controller 12 may output the 8K image data obtained after the pending image data is processed to a TCON 40, and the TCON 40 controls the 8K display panel to perform image display.

It should be noted that the IP core included in the image processing system may also be an IP core supporting other resolutions. For example, the IP core is an IP core that supports the resolutions of 1920×1080, that is, an IP core that supports full high definition (FHD for short). The resolution supported by the IP core included in the image processing system is not limited in the embodiment of the present application.

In the embodiment of the present application, during the process of converting resolution of the pending image data input by the video source (for example, directly converting a signal of a certain resolution to a signal of another resolution, or starting to transmit a signal of another resolution after interrupting the signal of a certain resolution for a certain duration, wherein the certain duration may be a preset duration), the input signal of the video source may be abnormal. At this time, the image displayed on the display panel may also be abnormal. The embodiment of this application provides two implementations, and both of the two implementations may avoid the abnormality of the image displayed on the display panel. The two implementations are schematically and separately illustrated below.

In a first implementation, the controller is further used to: determine an alternate display line of a previous image frame of a currently displayed image frame of the display panel when it is detected that the input signal of the video source is abnormal, wherein the line number of the alternate display line is the line number of the currently displayed line (that is, the display line where the abnormality currently occurs) plus one; output the image data starting from the alternate display line in the previous image frame to the display panel, and repeatedly output the image data of the previous image frame after the image data of the previous image frame is output until the input signal of the video source is back to normal. Since the display panel may receive the image data starting from the alternate display line in the previous image frame when the input signal of the video source is abnormal (that is, the currently displayed image frame is abnormal), and the display panel may repeatedly receive the image data of the previous image frame after receiving the image data of the last line in the previous image frame until the input signal of the video source is back to normal. Therefore, the display panel may always display the image, effectively avoiding the phenomenon that the image displayed on the display panel is abnormal during the process of converting resolution of the pending image data input by the video source. Moreover, in the image display process, the difference between two adjacent image frames is usually small. If the display panel displays the image data of the previous image frame, when a user views the image displayed on the display panel, the changes between the two image frames will not be not perceived, so the user experience may be improved while the display panel is always able to display images.

Figure 3:
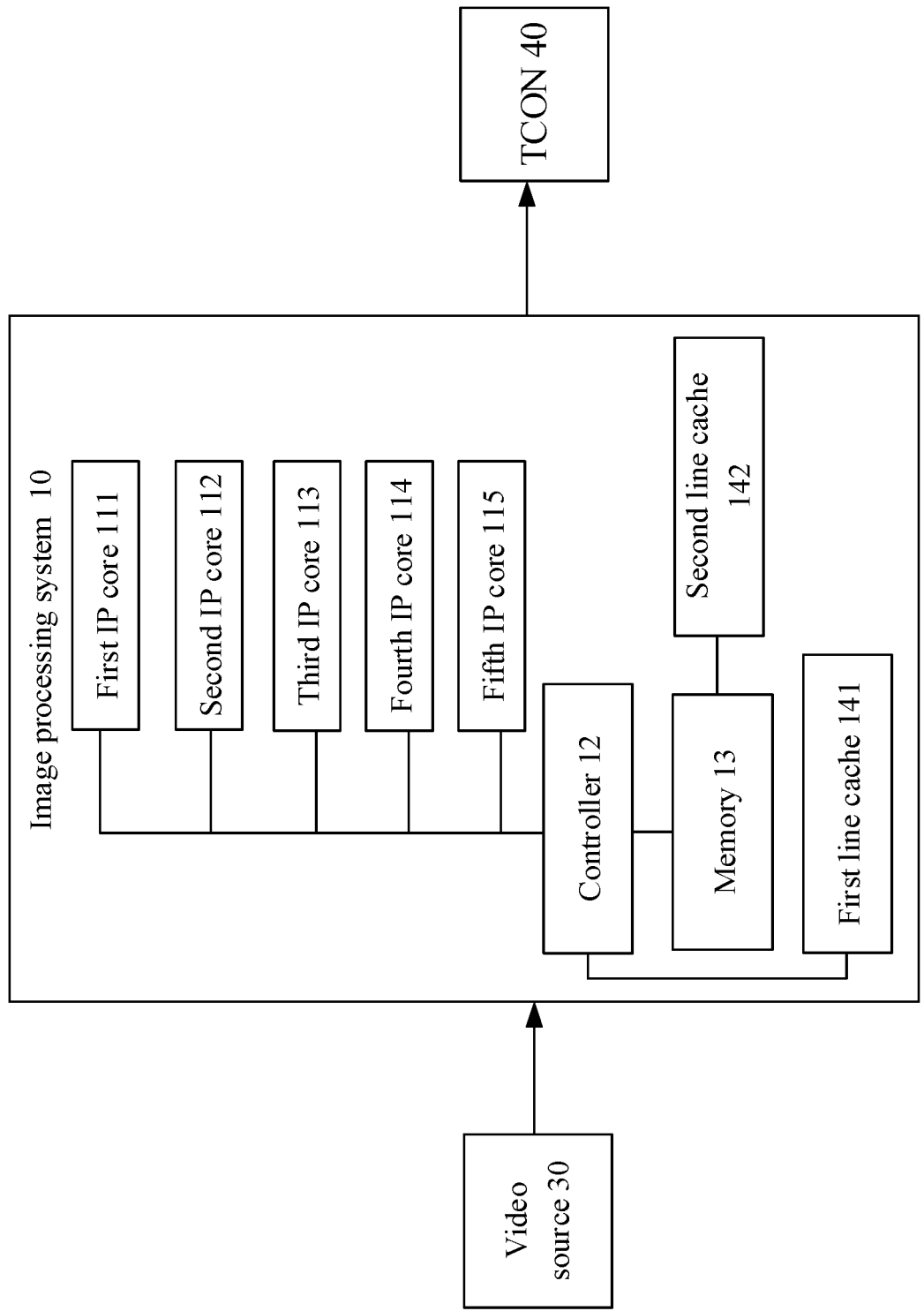
FIG. 3 is a block diagram of still another image processing system according to an embodiment of the present application.

As shown in FIG. 3, FIG. 3 is a block diagram of still another image processing system 10 according to an embodiment of the present application. The image processing system 10 may further include a memory 13 and two line caches 14. The two line caches 14 may include a first line cache 141 and a second line cache 142. The memory 13 may be a double data rate dynamic random access memory (DDR for short). Each of the two line caches 14 may be a line buffer. The memory 13 is used to store a previous image frame of a currently displayed image frame. The first line cache 141 is used to cache data of a next line of the currently displayed line of the currently displayed image frame. The second line cache 142 is used to cache data of a line with the same line number as cached by the first line cache 141 in the previous image frame of the currently displayed image frame. In the embodiment of the present application, when the display panel needs to display an image frame, the controller 12 may process the image frame line by line, and cache the processed data in the first line cache 141. The first line cache 141 may transmit the cached data to the display panel, thereby enabling the display panel to display the image frame. The controller 12 is used to: determine the line of the data currently cached by the second line cache 142 as the alternate display line when it is detected that the input signal of the video source 30 is abnormal; and acquire the image data starting from the alternate display line in the previous image frame from the memory 13 and output the image data starting from the alternate display line in the previous image frame to the display panel. In the embodiment of the present application, the controller 12 is further used to: determine that the display panel is ready to display a new image frame when it is detected that a start vertical (STV for short) signal in the TCON 40 is a rising edge signal, store a previous image frame of the new image frame which the display panel is ready to display in the memory 13, and store the first line of data of the image frame stored in the memory 13 in the second line cache 142.

Figure 4:
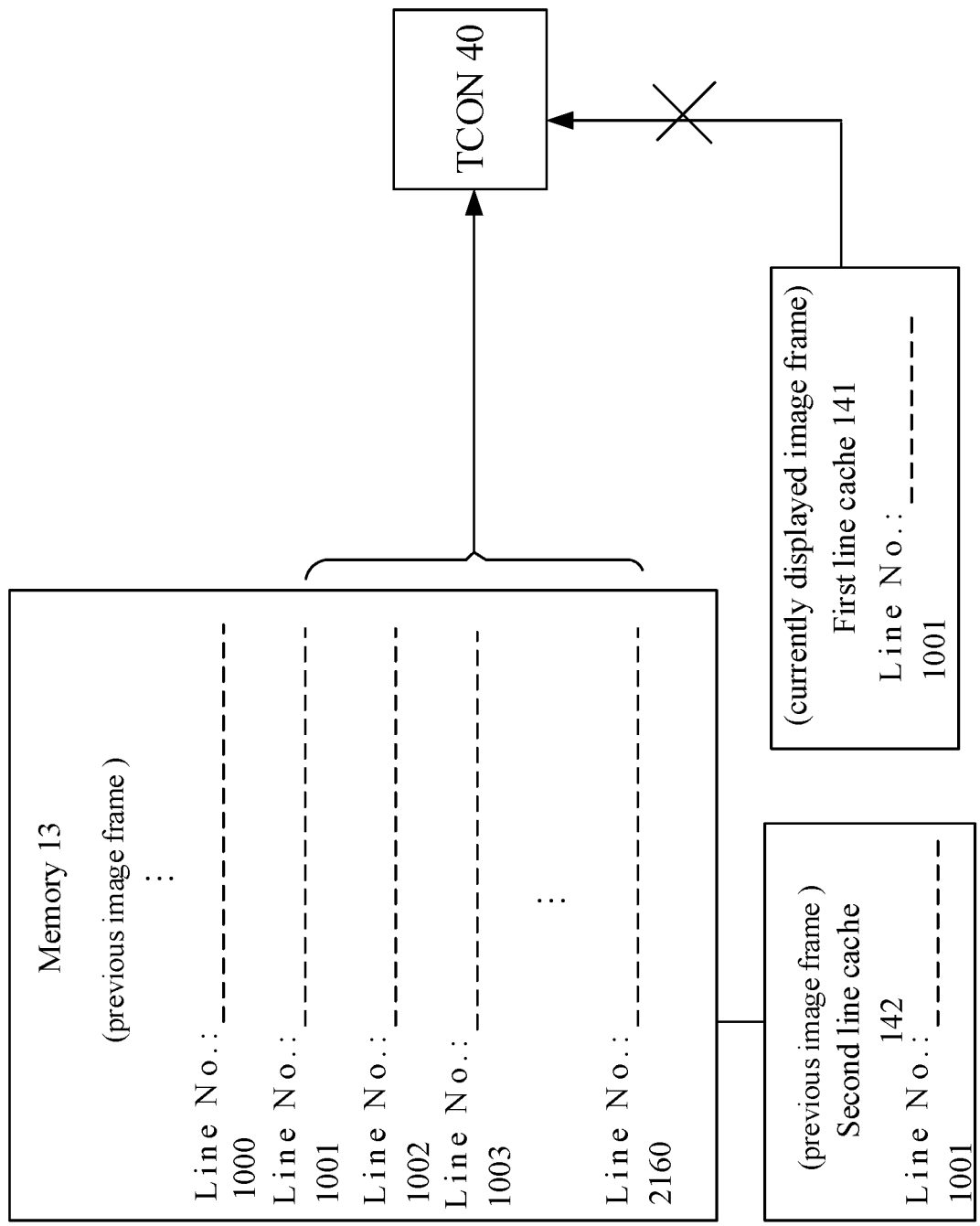
FIG. 4 is an effect diagram of image data sent by an image processing system to a display panel during resolution switching of pending image data according to an embodiment of the present application.

For example, referring to FIG. 4, FIG. 4 is an effect diagram of image data sent by an image processing system to a display panel when an input signal of a video source is abnormal according to an embodiment of the present application. The display panel is assumed to be a 4K display panel. When the currently displayed image frame of the display panel displays data of the 1000th line, the input signal of the video source 30 is abnormal, and DE signals (the DE signal is a valid data strobe signal) are lost. At this time, the second cache 142 caches data of the 1001st line in a previous image frame of the currently displayed image frame. The controller 12 determines the 1001st line in the previous image frame as the alternate display line, and then acquires the image data starting from 1001st line from the memory 13. The controller 12 may also generate DE signals, wherein the number of generated new DE signals is 2160−1001=1159, and then output the image data and the DE signals to the display panel. If the input signal of the video source 30 has not been back to normal after the controller 12 delivers the image data, the image data of the previous image frame stored in the memory 13 is repeatedly output until the input signal of the video source is back to normal. In practical application of the embodiment of the present application, when the image data of the image frame stored in the memory 13 is output to the display panel, the image data of the image frame stored in the memory 13 may be sent line by line to the second line cache 142, and then the second line cache 142 outputs image data to the display panel.

Figure 5:
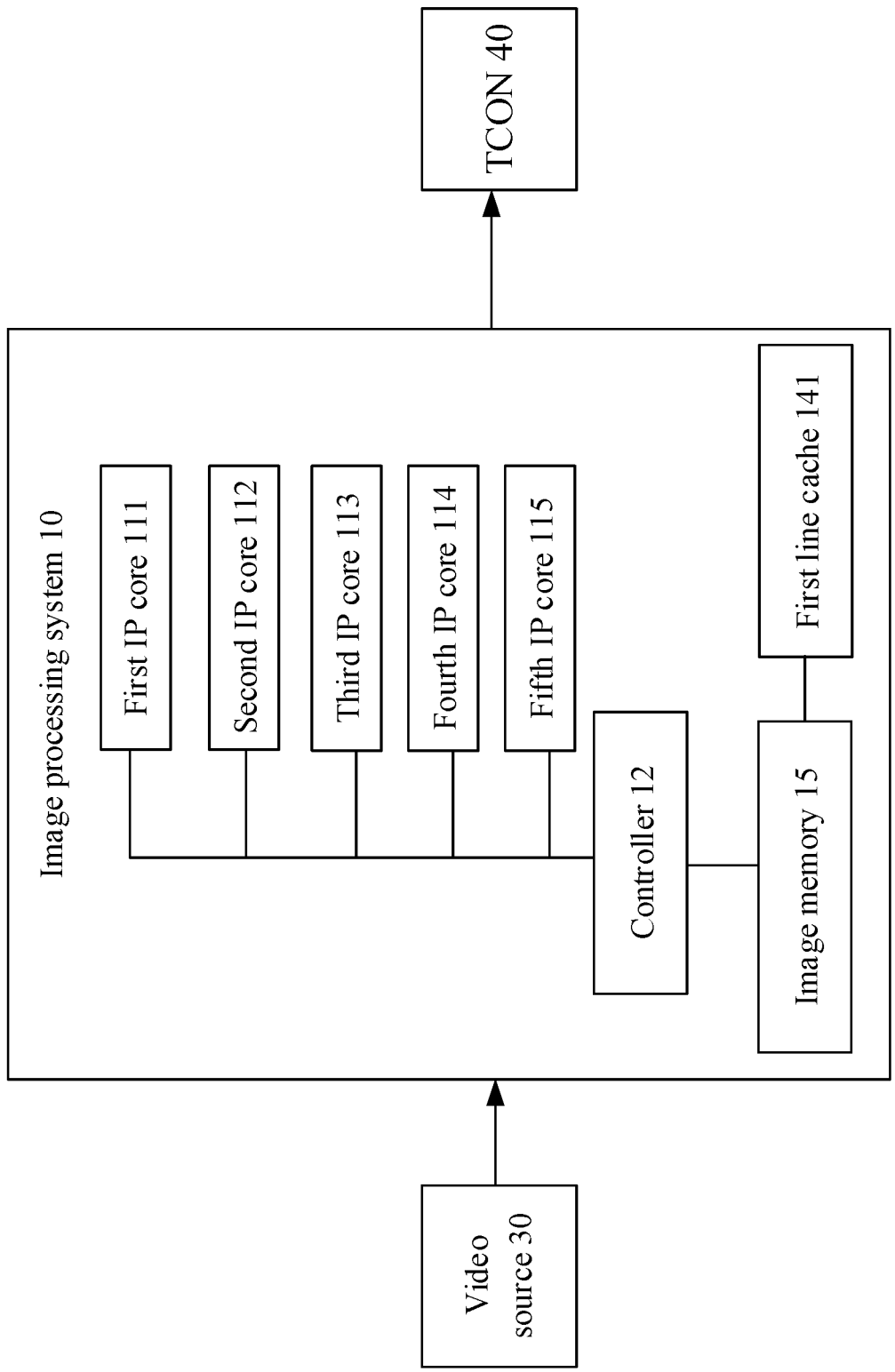
FIG. 5 is a block diagram of yet another image processing system according to an embodiment of the present application.

In a second implementation, as shown in FIG. 5, FIG. 5 is a block diagram of yet another image processing system 10 according to an embodiment of the present application. The image processing system 10 may further include an image memory 15. The image memory 15 may pre-store an image frame, which is an image frame that the display panel needs to display, that is, the image frame is the current display frame of the display panel. In the embodiment of the present application, when the display panel needs to display an image frame, the controller 12 may process the image frame in advance and store the processed image frame in the image memory 15. The image processing system 10 may further include a first line cache 141. The first line cache 141 is used to cache data of a next line of the currently displayed line of the currently displayed image frame. The image memory 15 may transmit the image data of the image frame stored therein to the first line cache 141 line by line. The first line cache 141 may send the cached data to the display panel, so that the display panel may display the image frame stored in the image memory 15. The controller 10 is further used to repeatedly output the image data of the image frame stored in the image memory 15 to the display panel when the input signal of the video source 30 is abnormal until the input signal of the video source 30 returns to normal. Since the currently displayed image frame is pre-stored in the image memory, when the input signal of the video source is abnormal, the display panel may repeatedly receive the image data of the currently displayed image frame until the input signal of the video source returns to normal. Therefore, the display panel may always display images, which effectively avoids the phenomenon that the image displayed on the display panel is abnormal during the process of converting resolution of the pending image data input by the video source. At this time, the memory for storing the previous image frame of the currently displayed image frame and the second line cache may not be provided, so that the display panel may always display the image normally.

Optionally, the controller 12 is further used to: gradually decreasing a refresh rate of image frames after m consecutive image frames when it is detected that difference between contents of any two adjacent image frames in the m consecutive image frames in the image frames input by the video source is less than a first content difference threshold, and when a refresh rate of the m consecutive image frames is greater than the first refresh rate, until the refresh rate of the image frames after the m consecutive image frames is reduced to a first refresh rate, wherein the m is an integer greater than or equal to 2, and the first refresh rate may be a first preset refresh rate, which may be configured in the display device before the display device is powered on for example. In the embodiment of the present application, when the image displayed by the display panel is partially stationary, the content of the previous image frame displayed by the display panel has little difference with the content of the latter image frame. At this time, the refresh rate of the image frames may be lowered and the effect of the images displayed by the display panel does not deteriorate. Therefore, the power consumption of the display device is effectively reduced while the images displayed by the display panel can be ensured to have good effects.

In practical application of the embodiment of the present application, the controller 12 is further used to: gradually increasing a refresh rate of image frames after n consecutive image frames when it is detected that difference between contents of any two adjacent image frames in the n consecutive image frames in the image frames input by the video source is greater than a second content difference threshold, and when a refresh rate of the n consecutive image frames is less than the second refresh rate, until the refresh rate of the image frames after the n consecutive image frames is increased to a second refresh rate, wherein the n is an integer greater than or equal to 2. Exemplary, the second refresh rate is greater than the first refresh rate, and the second refresh rate may be a second preset refresh rate, which may be configured in the display device before the display device is powered on for example. In the embodiment of the present application, when the content of the previous image frame displayed by the display panel is significantly different from the content of the latter image frame, the refresh rate of the image frames may be increased in order to ensure a good effect of the images displayed by the display panel.

It should be noted that, in the process of adjusting the refresh rate of the image frames, such as the process of gradually decreasing the refresh rate of the image frames, or the process of gradually increasing the refresh rate of the image frames, the controller 12 is further used to: pause adjustment of a refresh rate of image frames after i consecutive image frames and continuously maintain the current refresh rate of the image frames when it is detected that difference in contents of any two adjacent image frames in the i consecutive image frames in the image frames input by the video source is greater than or equal to the first content difference threshold and less than or equal to the second content difference threshold, wherein the i is an integer greater than or equal to 2. For example, the second content difference threshold is greater than the first content difference threshold.

Optionally, the content of the image can be reflected by at least one of gray value and pixel value, and the difference between contents may comprise at least one of gray value difference and pixel value difference.

In summary, the image processing system according to an embodiment of the present application acquires the first resolution supported by the display panel currently installed in the display device, identifies the second resolution of the pending image data input by the video source to the image processing system and determines a corresponding target data processing module according to the first resolution and the second resolution, to process the pending image data to obtain target image data, and the target image data is applicable to the currently installed display panel. Since at least two data processing modules are provided in the image processing system, the image processing system may be compatible with display panels having at least two resolutions, and the compatibility of the image display system is effectively improved compared with the existing image processing system. Moreover, the display panel may always display the image normally. When the image displayed by the display panel is partially stationary, the refresh rate of the image frame may be reduced, thereby effectively reducing the power consumption of the display device.

Figure 6:
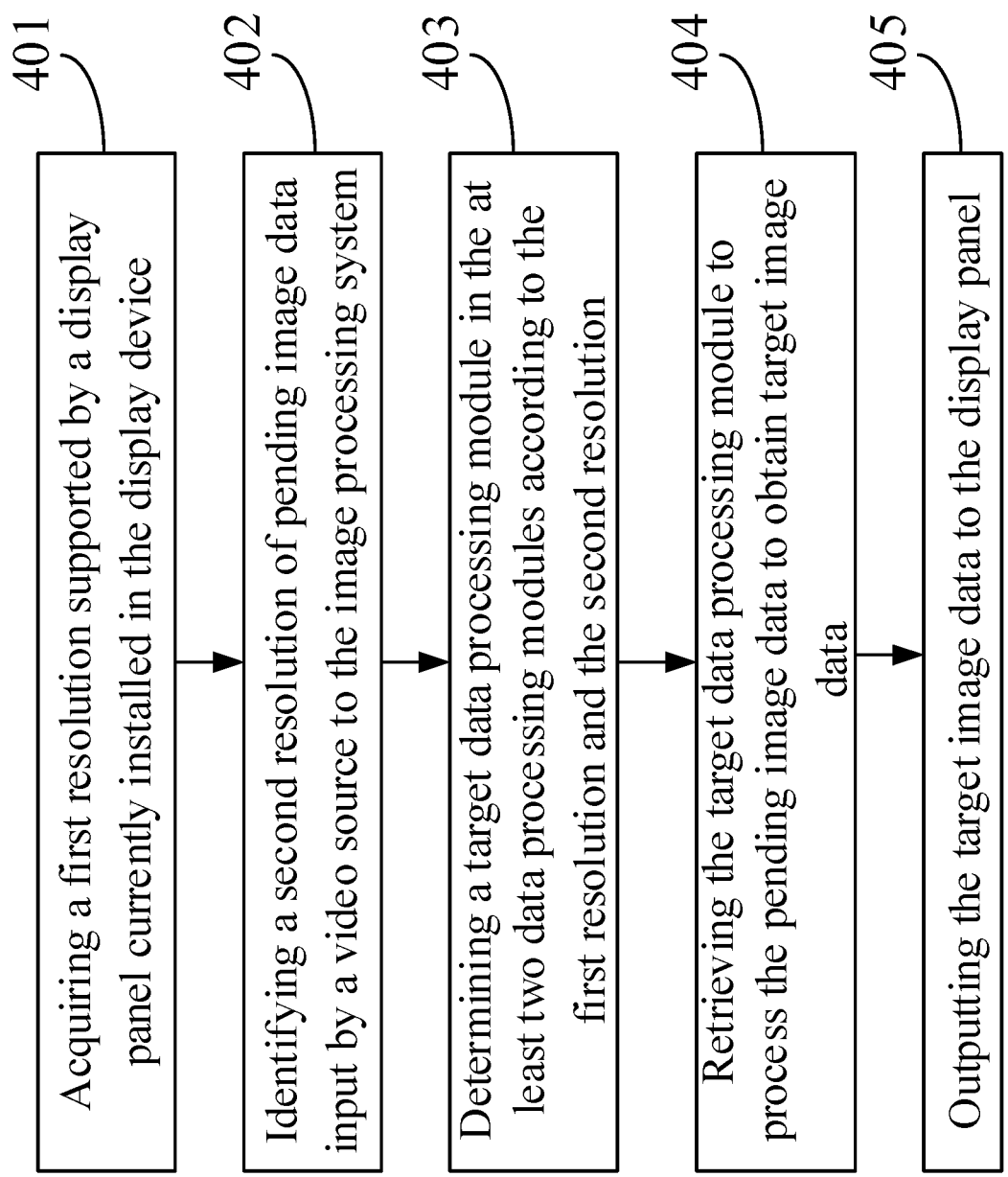
FIG. 6 is a flowchart of an image display method according to an embodiment of the present application.

The embodiment of the present application further provides an image display method. As shown in FIG. 6, FIG. 6 is a flowchart of an image display method according to an embodiment of the present application. The image display method is applied to an image processing system in a display device. The image processing system includes at least two data processing modules. Each of the data processing modules is used to convert image data input to the data processing module into image data having a resolution supported by the data processing module. The resolutions supported by the at least two data processing module are different. The image display method may include the following steps.

In step 401, a first resolution supported by a display panel currently installed in the display device is acquired.

In step 402, a second resolution of pending image data input by a video source to the image processing system is identified.

In step 403, a target data processing module in the at least two data processing modules is determined according to the first resolution and the second resolution, the target data processing module supports the first resolution, and the target data processing module is used to convert the image data of the second resolution input to the target data processing module into image data having the first resolution.

In step 404, the target data processing module is retrieved to process the pending image data to obtain target image data. The target image data is data on which the display panel is based when the display panel displays images, and the target image data is image data having the first resolution.

In step 405, the target image data is output to the display panel.

In summary, the image processing method according to an embodiment of the present application acquires the first resolution supported by the display panel currently installed in the display device, identifies the second resolution of the pending image data input by the video source to the image processing system and determines a corresponding target data processing module according to the first resolution and the second resolution to process the pending image data to obtain target image data. The target image data is applicable to the currently installed display panel. Since at least two data processing modules are provided in the image processing system, the image processing system may be compatible with display panels having at least two resolutions, and the compatibility of the image display system is effectively improved compared with the existing image processing system. Moreover, the display panel may always display the image normally. When the image displayed by the display panel is partially stationary, the refresh rate of the image frame may be reduced, thereby effectively reducing the power consumption of the display device.

Optionally, the data processing module is an IP core, and the data processing module in the image processing system includes at least two of a first IP core, a second IP core, a third IP core, a fourth IP core, and a fifth IP core. The first IP core is used to convert image data having a resolution lower than 8K into image data having a resolution of 8K. The second IP core is used to convert image data having a resolution higher than 4K to image data having a resolution of 4K. The third IP core is used to convert image data having a resolution lower than 4K into image data having a resolution of 4K. The fourth IP core is used to convert image data having a resolution of 4K to bright view III image data having a resolution of 4K. The fifth IP core is used to convert image data having a resolution of 8K into bright view III image data having a resolution of 8K.

Figure 7:
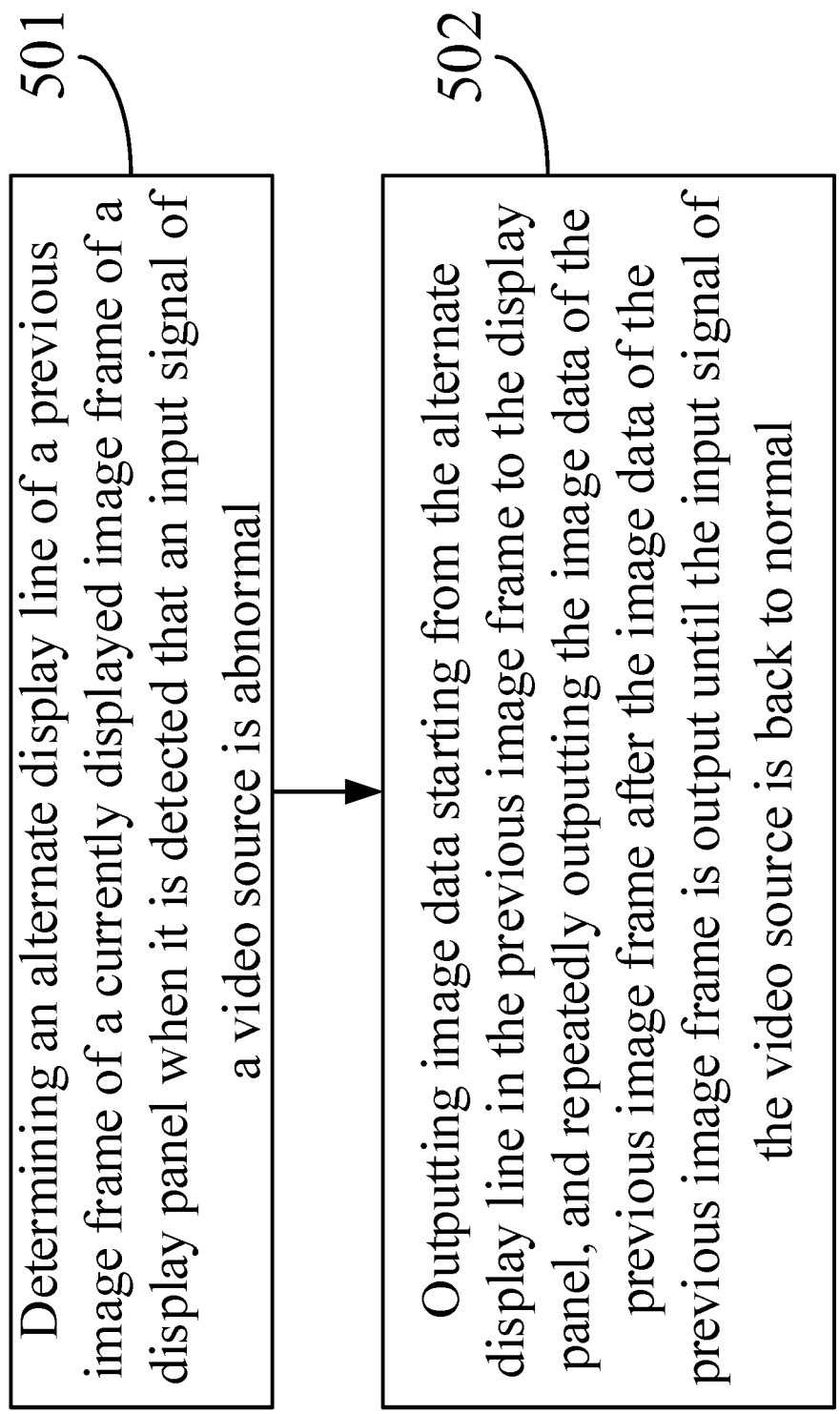
FIG. 7 is a flowchart of another image display method according to an embodiment of the present application.

Optionally, the image processing system may further include a memory and two line caches. The memory is used to store a previous image frame of a currently displayed image frame. The two line caches include a first line cache and a second line cache. The first line cache is used to cache data of a next line of the currently displayed line of the currently displayed image frame. The second line cache is used to cache data of a line in the previous image frame of the currently displayed image frame with the same line number as cached by the first line cache in the previous image frame of the currently displayed image frame. Referring to FIG. 7, FIG. 7 is a flowchart of another image display method according to an embodiment of the present application. The image display method may further include the following steps.

In step 501, when it is detected that an input signal of a video source is abnormal, an alternate display line of a previous image frame of a currently displayed image frame of a display panel is determined. The line number of the alternate display line is the line number of the currently displayed line plus one.

For example, the line of the data currently cached by the second line cache may be determined as the alternate display line.

In step 502, image data starting from the alternate display line in the previous image frame is output to the display panel, and the image data of the previous image frame is repeatedly output after the image data of the previous image frame is output until the input signal of the video source is back to normal.

For example, the image data starting from the alternate display line in the previous image frame may be acquired from the memory, and the image data starting from the alternate display line in the previous image frame is output to the display panel.

Optionally, the image processing system may further include an image memory used to store the currently displayed image frame of the display panel. The image display method may further include the following step.

When it is detected that the input signal of the video source is abnormal, the image data of the currently displayed image frame is repeatedly output to the display panel until the input signal of the video source is back to normal.

Optionally, the image display method may include: gradually decreasing a refresh rate of image frames after m consecutive image frames when it is detected that difference between contents of any two adjacent image frames in the m consecutive image frames in the image frames input by the video source is less than a first content difference threshold, until the refresh rate of the image frames after the m consecutive image frames is reduced to a first refresh rate, wherein the m is an integer greater than or equal to 2, and the first refresh rate may be a first preset refresh rate, which may be configured in the display device before the display device is powered on for example.

Optionally, the image display method may include: gradually increasing a refresh rate of image frames after n consecutive image frames when it is detected that difference between contents of any two adjacent image frames in the n consecutive image frames in the image frames input by the video source is greater than a second content difference threshold, and when a refresh rate of the n consecutive image frames is less than the second refresh rate, until the refresh rate of the image frames after the n consecutive image frames is increased to a second refresh rate, wherein the n is an integer greater than or equal to 2. Exemplary, the second refresh rate is greater than the first refresh rate, and the second refresh rate may be a second preset refresh rate, which may be configured in the display device before the display device is powered on for example Optionally, the image display method may include: pausing adjustment of a refresh rate of image frames after i consecutive image frames and continuously maintaining the current refresh rate of the image frames in the process of adjusting the refresh rate of the image frames, such as the process of gradually decreasing the refresh rate of the image frames or the process of gradually increasing the refresh rate of the image frames when it is detected that difference in contents of any two adjacent image frames in the i consecutive image frames in the image frames input by the video source is greater than or equal to the first content difference threshold and less than or equal to the second content difference threshold, wherein the i is an integer greater than or equal to 2.

Optionally, the content of the image can be reflected by at least one of gray value and pixel value, and the difference between contents comprises at least one of gray value difference and pixel value difference.

In the foregoing embodiment, the first content difference threshold and the second content difference threshold may both be preset content difference thresholds, or may be dynamically set content difference thresholds, and may be fixed values or variable values. For example, the second content difference threshold is greater than or equal to the first content difference threshold.

It can be clearly understood by those skilled in the art that for the convenience and brevity of the description, the specific working principle of the image display method described above may refer to the corresponding part in the embodiment of the foregoing image processing system, and will not be described again.

It should be noted that the sequence of the steps of the image display method according to an embodiment of the present application may be appropriately adjusted, and the steps may also be correspondingly added or deleted according to the situation, and variations of the methods that may be easily conceived by those skilled in the art within the technical scope of the present application shall all be covered by the scope of the present application and therefore will not be described again.

In summary, the image display method according to an embodiment of the present application acquires the first resolution supported by the display panel currently installed in the display device, identifies the second resolution of the pending image data input by the video source to the image processing system, and determines a corresponding target data processing module according to the first resolution and the second resolution to process the pending image data to obtain target image data. The target image data is applicable to the currently installed display panel. Since at least two data processing modules are provided in the image processing system, the image processing system may be compatible with display panels having at least two resolutions, and the compatibility of the image display system is effectively improved compared with the existing image processing system. Moreover, the display panel may always display the image normally. When the image displayed by the display panel is partially stationary, the refresh rate of the image frame may be reduced, thereby effectively reducing the power consumption of the display device.

An embodiment of the present application further provides a display device, which may be the display device shown in FIG. 1. The display device may include the image processing system shown in FIG. 1, FIG. 2, FIG. 3 or FIG. 5. The display device may be any product or component having a display function such as electronic paper, mobile phone, tablet computer, television, display, notebook computer, digital photo frame, navigator and the like.

Alternatively, the image processing system may be integrated on a TCON of the display device, or the image processing system may be integrated in a separate control chip, or the image processing system may be integrated on a graphics card of the display device, or the image processing system may be integrated in a system on chip (SOC for short) of the display device.

Figure 8:
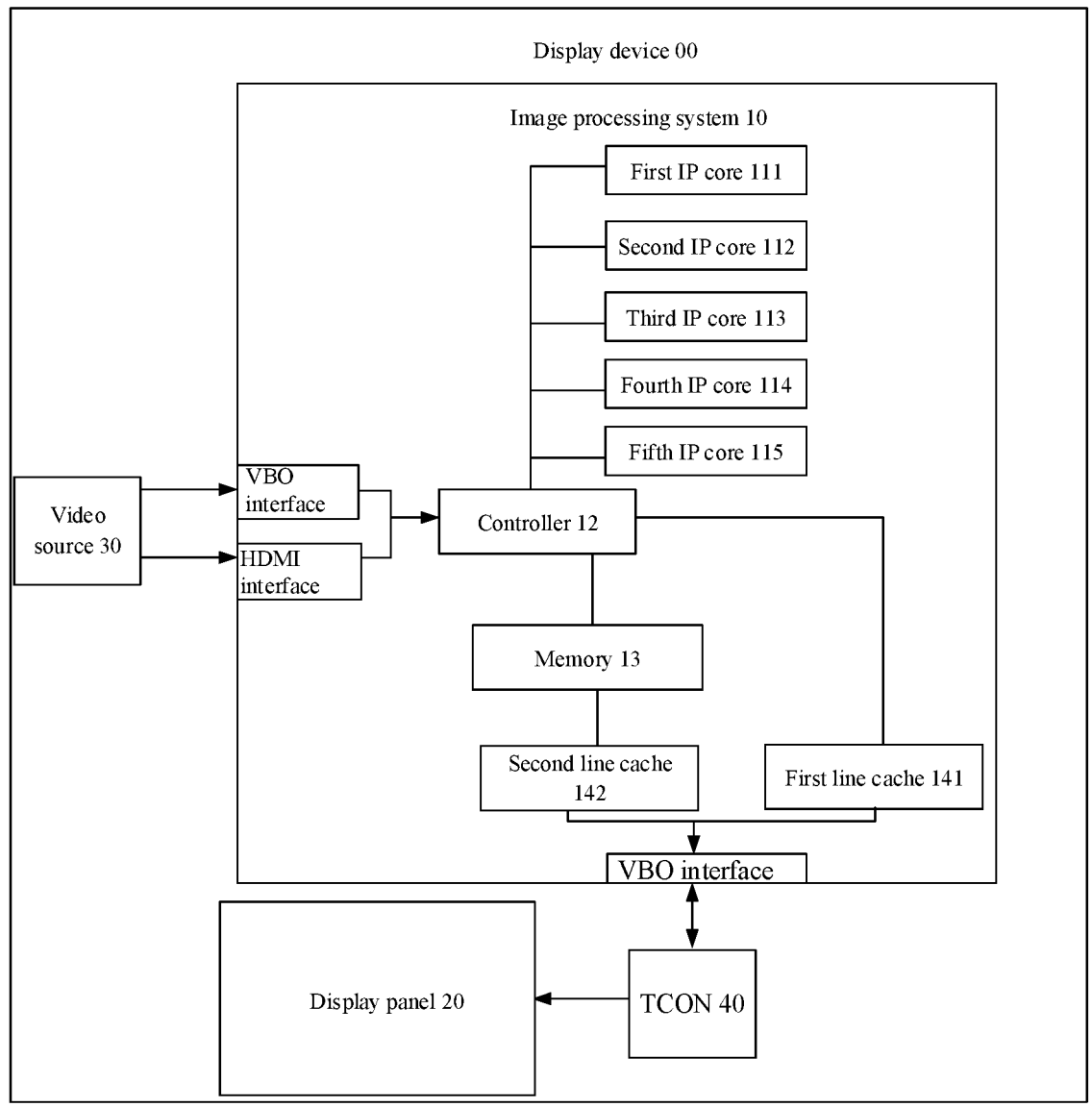
FIG. 8 is a block diagram of a display device according to an embodiment of the present application.

In practical application, as shown in FIG. 8, FIG. 8 is a block diagram of another display device 00 according to an embodiment of the present application. It is assumed that the display device 00 is a television. The image processing system 10 in the display device 00 may further include a high definition multimedia (HDMI for short) interface and a VBO interface (V-by-One, which is a high-definition digital display interface). The video source 30 in the display device 00 transmits the pending image data to the image processing system 10 through the VBO interface and the HDMI interface. The image processing system 10 delivers the processed image data to the TCON 40 through the VBO interface, thereby enabling the TCON 40 to control the display panel 20 to display images.

In an exemplary embodiment, there is also provided a controller including: at least one processor, a memory, and at least one bus. The memory is coupled to the processor via the bus. The processor is used to execute instructions stored in the memory. The processor executes instructions to implement the image display method described in the above steps 401 to 405, or the image display method described in the above steps 501 to 502.

In an exemplary embodiment, there is also provided a non-transitory computer readable storage medium including instructions, such as a memory including instructions executable by a processor of a display device to complete the image display method described in the above steps 401 through 405, or the image display method described in the above steps 501 to 502. For example, the non-transitory computer readable storage medium may be a ROM, a random access memory (RAM), a CD-ROM, a magnetic tape, a floppy disk, or an optical data storage device, etc.

In an exemplary embodiment, there is also provided a computer program product having stored instructions that cause the computer to perform the image display method as described in the above steps 401 through 405, or the image display method described in the above steps 501 to 502 when run on a computer.

In an exemplary embodiment, there is also provided a chip including programmable logic circuitry and/or program instructions for implementing the image display method as described in the above steps 401 through 405, or the image display method as described in the above steps 501 to 502 when running.

Persons of ordinary skill in the art can understand that all or part of the steps described in the above embodiments may be completed through hardware, or through relevant hardware instructed by programs that may be stored in a computer readable storage medium, such as read-only memory, disk or CD, etc.

The foregoing descriptions are only preferred embodiments of the present application, and are not intended to limit the present application. Within the spirit and principles of the application, any modifications, equivalent substitutions, improvements, etc., are within the scope of protection of the present application.

What is claimed is:

1. An image processing system, comprising at least two data processing modules, wherein each of the data processing modules is used to convert image data input to the data processing module into image data having a resolution supported by the data processing module, the resolutions supported by the at least two data processing modules are different, and the image processing system further comprises:
   a controller, used for:
   acquiring a first resolution supported by a display panel currently installed in a display device;
   identifying a second resolution of pending image data input by a video source to the image processing system;
   determining, in the at least two data processing modules, a target data processing module according to the first resolution and the second resolution, wherein the target data processing module supports the first resolution, and the target data processing module is used to convert image data having the second resolution input to the target data processing module into image data having the first resolution;
   retrieving the target data processing module to process the pending image data to obtain target image data; and
   outputting the target image data to the display panel.

2. The system of claim 1, wherein the controller is further used for:
   determining, when it is detected that an input signal of the video source is abnormal, an alternate display line of a previous image frame of a currently displayed image frame of the display panel, wherein a line number of the alternate display line is a line number of a currently displayed line plus 1; and
   outputting image data starting from the alternate display line in the previous image frame to the display panel, and repeatedly outputting image data of the previous image frame after the image data of the previous image frame is output until the input signal of the video source is back to normal.

3. The system of claim 2, further comprising:
   a memory used to store the previous image frame of the currently displayed image frame;
   two line caches comprising a first line cache and a second line cache, wherein the first line cache is used to cache data of a next line of the currently displayed line of the currently displayed image frame, and the second line cache is used to cache data of a line in the previous image frame of the currently displayed image frame with the same line number as cached by the first line cache; wherein the controller is used for:

determining, as the alternate display line, the line of data currently cached by the second line cache; and acquiring, from the memory, image data starting from the alternate display line in the previous image frame and outputting the image data starting from the alternate display line in the previous image frame to the display panel.

4. The system of claim 1, further comprising: an image memory used to store a currently displayed image frame of the display panel; wherein the controller is further used for:

repeatedly outputting image data of the currently displayed image frame to the display panel until the input signal of the video source is back to normal, when it is detected that an input signal of the video source is abnormal.

5. The system of claim 1, wherein the controller is further used for:

gradually decreasing a refresh rate of image frames after m consecutive image frames when it is detected that difference between contents of any two adjacent image frames in the m consecutive image frames in the image frames input by the video source is less than a first content difference threshold, and when a refresh rate of the m consecutive image frames is greater than the first refresh rate, until the refresh rate of the image frames after the m consecutive image frames is reduced to a first refresh rate, wherein the m is an integer greater than or equal to 2.

6. The system of claim 5, wherein the controller is further used for:

gradually increasing a refresh rate of image frames after n consecutive image frames when it is detected that difference between contents of any two adjacent image frames in the n consecutive image frames in the image frames input by the video source is greater than a second content difference threshold, and when a refresh rate of the n consecutive image frames is less than the second refresh rate, until the refresh rate of the image frames after the n consecutive image frames is increased to a second refresh rate, wherein the second refresh rate is greater than the first refresh rate, the n is an integer greater than or equal to 2.

7. The system of claim 1, wherein the data processing module is an intellectual property IP core, and the data processing module in the system comprises: at least two of a first IP core, a second IP core, a third IP core, a fourth IP core and a fifth IP core, the first IP core is used to convert image data having a resolution lower than 8K into image data having a resolution of 8K;

the second IP core is used to convert image data having a resolution higher than 4K into image data having a resolution of 4K;

the third IP core is used to convert image data having a resolution lower than 4K into image data having a resolution of 4K;

the fourth IP core is used to convert image data having a resolution of 4K into bright view III image data having a resolution of 4K; and the fifth IP core is used to convert image data having a resolution of 8K into bright view III image data having a resolution of 8K.

8. The system of claim 7, wherein when the system comprises one of the fourth IP core and the fifth IP core, the system further comprises: a pixel rendering IP core used to perform a pixel rendering process on bright view III image data.

9. The system of claim 8, further comprising:

a memory used to store the previous image frame of the currently displayed image frame;

two line caches comprising a first line cache and a second line cache, wherein the first line cache is used to cache data of a next line of the currently displayed line of the currently displayed image frame, and the second line cache is used to cache data of a line in the previous image frame of the currently displayed image frame with the same line number as cached by the first line cache; wherein the controller is further used for:

determining, as the alternate display line, the line of data currently cached by the second line cache;

acquiring, from the memory, image data starting from the alternate display line in the previous image frame, and outputting the image data starting from the alternate display line in the previous image frame to the display panel;

gradually decreasing a refresh rate of image frames after m consecutive image frames when it is detected that difference between contents of any two adjacent image frames in the m consecutive image frames in the image frames input by the video source is less than a first content difference threshold, and when a refresh rate of the m consecutive image frames is greater than the first refresh rate, until the refresh rate of the image frames after the m consecutive image frames is reduced to a first refresh rate, wherein the m is an integer greater than or equal to 2;

gradually increasing a refresh rate of image frames after n consecutive image frames when it is detected that difference between contents of any two adjacent image frames in the n consecutive image frames in the image frames input by the video source is greater than a second content difference threshold, and when a refresh rate of the n consecutive image frames is less than the second refresh rate, until the refresh rate of the image frames after the n consecutive image frames is increased to a second refresh rate, wherein the second refresh rate is greater than the first refresh rate, the n is an integer greater than or equal to 2; and, pausing adjustment of a refresh rate of image frames after i consecutive image frames and continuously maintaining the current refresh rate of the image frames in the process of gradually decreasing the refresh rate of the image frames or gradually increasing the refresh rate of the image frames when it is detected that difference in contents of any two adjacent image frames in the i consecutive image frames in the image frames input by the video source is greater than or equal to the first content difference threshold and less than or equal to the second content difference threshold, wherein the i is an integer greater than or equal to 2; wherein, the difference between contents comprises at least one of gray value difference and pixel value difference.

10. The system of claim 1, wherein the controller is further used for:

pausing adjustment of a refresh rate of image frames after i consecutive image frames and continuously maintaining the current refresh rate of the image frames in the process of gradually decreasing the refresh rate of the image frames or gradually increasing the refresh rate of the image frames when it is detected that difference in contents of any two adjacent image frames in the i consecutive image frames in the image frames input by the video source is greater than or equal to the first content difference threshold and less than or equal to the second content difference threshold, wherein the i is an integer greater than or equal to 2.

11. An image display method applied in an image processing system in a display device, wherein the image processing system comprises at least two data processing modules, each of the data processing modules is used to convert image date input to the data processing module into image data having a resolution supported by the data processing module, the resolutions supported by the at least two data processing modules are different, and the method comprises:
  acquiring a first resolution supported by a display panel currently installed in the display device;
  identifying a second resolution of pending image data input by a video source to the image processing system;
  determining, in the at least two data processing modules, a target data processing module according to the first resolution and the second resolution, wherein the target data processing module supports the first resolution, and the target data processing module is used to convert image data having the second resolution input to the target data processing module into image data having the first resolution;
  retrieving the target data processing module to process the pending image data to obtain target image data; and
  outputting the target image data to the display panel.

12. The method of claim 11, further comprising:
  determining, when it is detected that an input signal of the video source is abnormal, an alternate display line of a previous image frame of a currently displayed image frame of the display panel, wherein a line number of the alternate display line is a line number of a currently displayed line plus 1; and
  outputting the image data starting from the alternate display line in the previous image frame to the display panel, and repeatedly outputting image data of the previous image frame after the image data of the previous image frame is output until the input signal of the video source is back to normal.

13. The method of claim 12, wherein the system further comprises: a memory and two line caches, wherein the memory is used to store the previous image frame of the currently displayed image frame, the two line caches comprises a first line cache and a second line cache, the first line cache is used to cache data of a next line of the currently displayed line of the currently displayed image frame, and the second line cache is used to cache data of a line in the previous image frame of the currently displayed image frame with the same line number as cached by the first line cache; and
  determining the alternate display line of the previous image frame of the currently displayed image frame of the display panel comprises:
    determining, as the alternate display line, the line of data currently cached by the second line cache;
  outputting the image data starting from the alternate display line in the previous image frame to the display panel comprises:
    acquiring, from the memory, image data starting from the alternate display line in the previous image frame, and outputting panel the image data starting from the alternate display line in the previous image frame to the display.

14. A non-transitory computer readable storage medium having stored therein a computer program, wherein the stored computer program is capable of implementing the image display method of any of claim 12 when executed by a processor.

15. The method of claim 11, wherein the system further comprises: an image memory used to store a currently displayed image frame of the display panel; and
  the method further comprises:
    repeatedly outputting image data of the currently displayed image frame to the display panel when it is detected that the input signal of the video source is abnormal, until the input signal of the video source is back normal.

16. The method of claim 11, further comprising:
  gradually decreasing a refresh rate of image frames after m consecutive image frames when it is detected that difference between contents of any two adjacent image frames in the m consecutive image frames in the image frames input by the video source is less than a first content difference threshold, and when a refresh rate of the m consecutive image frames is greater than the first refresh rate, until the refresh rate of the image frames after the m consecutive image frames is reduced to a first refresh rate, wherein the m is an integer greater than or equal to 2.

17. The method of claim 16, further comprising:
  gradually increasing a refresh rate of image frames after n consecutive image frames when it is detected that difference between contents of any two adjacent image frames in the n consecutive image frames in the image frames input by the video source is greater than a second content difference threshold, and when a refresh rate of the n consecutive image frames is less than the second refresh rate, until the refresh rate of the image frames after the n consecutive image frames is increased to a second refresh rate, wherein the second refresh rate is greater than the first refresh rate, the n is an integer greater than or equal to 2.

18. The method of claim 17 further comprising:
  pausing adjustment of a refresh rate of image frames after i consecutive image frames and continuously maintaining the current refresh rate of the image frames in the process of adjusting the refresh rate of the image frames when it is detected that difference in contents of any two adjacent image frames in the i consecutive image frames in the image frames input by the video source is greater than or equal to the first content difference threshold and less than or equal to the second content difference threshold, wherein the i is an integer greater than or equal to 2.

19. A display device comprising an image processing system, wherein the image processing system comprises at least two data processing modules, wherein each of the data processing modules is used to convert image data input to the data processing module into image data having a resolution supported by the data processing module, the resolutions supported by the at least two data processing modules are different, and the image processing system further comprises:
- a controller, used for:
- acquiring a first resolution supported by a display panel currently installed in a display device;
- identifying a second resolution of pending image data input by a video source to the image processing system;
- determining, in the at least two data processing modules, a target data processing module according to the first resolution and the second resolution, wherein the target data processing module supports the first resolution, and the target data processing module is used to convert image data having the second resolution input to the target data processing module into image data having the first resolution;
- retrieving the target data processing module to process the pending image data to obtain target image data; and
- outputting the target image data to the display panel.

20. The display device of claim 19, wherein the image processing system is integrated on any of the following devices: a timing controller of the display device, a separate control chip, and a graphics card of the display device.

* * * * *